US009719887B2

United States Patent
Ratilla et al.

(10) Patent No.: US 9,719,887 B2
(45) Date of Patent: Aug. 1, 2017

(54) FIELD DEVICE COMMISSIONING SYSTEM AND FIELD DEVICE COMMISSIONING METHOD

(71) Applicant: YOKOGAWA ELECTRIC CORPORATION, Musashino-shi, Tokyo (JP)

(72) Inventors: Jasper Bryan Sale Ratilla, Singapore (SG); Hideyuki Sakamoto, Singapore (SG); Maria Norina Epa Jandusay, Singapore (SG); Charisma Tan Delos Reyes, Singapore (SG)

(73) Assignee: Yokogawa Electric Corporation, Tokyo (JP)

( * ) Notice: Subject to any disclaimer, the term of this patent is extended or adjusted under 35 U.S.C. 154(b) by 708 days.

(21) Appl. No.: 14/180,593

(22) Filed: Feb. 14, 2014

(65) Prior Publication Data

US 2015/0233790 A1 Aug. 20, 2015

(51) Int. Cl.
  *G01M 99/00* (2011.01)
  *G05B 19/04* (2006.01)
  *G05B 19/042* (2006.01)

(52) U.S. Cl.
  CPC ......... *G01M 99/00* (2013.01); *G05B 19/0426* (2013.01); *G05B 2219/25068* (2013.01); *G05B 2219/25428* (2013.01)

(58) Field of Classification Search
  CPC .............. G01M 99/00; G05B 19/0426; G05B 2219/25068; G05B 2219/25428
  See application file for complete search history.

(56) References Cited

U.S. PATENT DOCUMENTS

| 6,618,630 | B1 | 9/2003 | Jundt et al. |
| 7,069,580 | B1* | 6/2006 | Deitz ................. G05B 19/0428 713/168 |
| 2002/0142719 | A1 | 10/2002 | Maneval |
| 2007/0075916 | A1 | 4/2007 | Bump et al. |
| 2009/0118843 | A1 | 5/2009 | Rahman et al. |
| 2011/0191500 | A1 | 8/2011 | Odayappan et al. |
| 2011/0313547 | A1 | 12/2011 | Hernandez et al. |

(Continued)

FOREIGN PATENT DOCUMENTS

WO 2007/121141 A2 10/2007

*Primary Examiner* — Manuel L Barbee
(74) *Attorney, Agent, or Firm* — Sughrue Mion, PLLC

(57) ABSTRACT

A field device commissioning system includes a commissioning tool, which is configured to communicate with a field device and a repository. The commissioning tool is configured to retrieve at least one property from a field device. The commissioning tool is configured to determine, from a registration file in the repository, if the retrieved at least one property is in the registration file. When the retrieved at least one property is determined to be in the registration file, perform a first test. When the retrieved at least one property is determined to be not in the registration file, determine, from a control system loop information file in the repository, if the retrieved at least one property is for a predetermined field device. When the retrieved at least one property is determined to be for the predetermined device, perform a second test different from the first test. When the retrieved property is determined to be not for the predetermined device, perform a third test different from the first and second tests.

15 Claims, 8 Drawing Sheets

(56) References Cited

U.S. PATENT DOCUMENTS

2012/0250544 A1    10/2012  Sasaki et al.
2014/0067091 A1    3/2014  Vishwanath et al.
2014/0130874 A1*  5/2014  Burlage .............. G01F 23/0038
                                                          137/1

* cited by examiner

| | | Linearization type 175 of field device which is retrieved from field device | | | | | | | | |
|---|---|---|---|---|---|---|---|---|---|---|
| | | Logic 1 | | Logic 2 | | Logic 3 | | Logic 4 | | Logic 5 | |
| | | Linear | Other | Linear | Other | Linear | Other | Linear | Other | Linear | Other |
| Linearization type 170 of field device which is configured in control system | Linear | OK | NG | ACK | NG | NG | OK | NG | ACK | OK | OK |
| | Other | NG | NG | NG | NG | OK | NG | ACK | NG | OK | NG |

FIELD DEVICE COMMISSIONING SYSTEM AND FIELD DEVICE COMMISSIONING METHOD

BACKGROUND

Fields of Invention

The disclosure of the invention relates to a field device commissioning system and a method of commissioning a field device in an industrial plant.

Field Device

Typical examples of field devices are instruments or transmitters which are used to obtain process variables in an equipment or part of an industrial process in an industrial facility or plant. Some devices are used for specific process variables. For example, the field device can be used as a temperature transmitter for temperature process variable, a flowmeter for flowrate process variable, and a pressure transmitter for pressure process variable.

Some field devices are configurable to be used for different types of process variables. In some cases, pressure transmitters are configurable for temperature process variable, flowrate process variable or temperature pressure process variable. However, such devices can be configured to measure only one designated process variable when in use.

There are many vendors manufacturing different types of field devices. To ensure compatibility, the field devices are configured to function according to one of the standard communication protocols, such as HART, or Foundation Fieldbus. A field device which uses the HART communication protocol will be hereinafter be referred to as a HART field device, one using Foundation Fieldbus is FF-H1 field device.

Plant Management and Control System

A plant management and control system may typically include a device management system and a control system as shown in FIG. 1. Other systems may optionally be included in that system to perform other functionalities.

A device management system acts as the central database for field device maintenance information. This information can include details about device parts, links to device documents, device description files, details about device inspection activities, device parameter history, and device messages. The device management system can also manage the information acquired from device calibration tools and applications by downloading or synchronization. The device management system can manage devices connected to control systems for example:

(a) control system (such as CENTUM™); and
(b) safety-instrumented system (ProSafe-RS™)

Commissioning

In an industrial plant, a typical installation includes connecting field devices and equipment to a control system and/or a device management system in a control room and performing configuration. After completion of the installation, the next step is a process for commissioning. Commissioning is a process for testing if the field devices, equipment, facility or industrial plant will perform one or more specified functions according to design objectives or specifications. The commissioning is done by performing a manual work check function. There are different manual work check functions. Different check functions are done differently on different field devices. Examples of check functions are as follows.

(a) Connection check is a check function that evaluates a connection and a physical location of a field device in the plant.

(b) Range comparison check is a check function that evaluates if a range information setting on function blocks in a control system for the plant matches a range information setting on a field device.

(c) Linearization check is a check function that compares the linearization type from the physical field device with an input signal conversion for the field device in the control system.

(d) Input loop check is a check function that evaluates if a field device which is configured to measure an input process variable in an input loop is communicating with a control system by reflecting in the control system, a test data written to the field device.

(e) Output loop check is a check function that evaluates if a control system is communicating with a field device configured to measure an output process variable in an output loop, where the evaluation is done by determining if the field device reflects a test data written to a manipulative value of the control system.

In the system of FIG. 1, commissioning of field devices is done manually. A user who is doing commissioning work, has to decide manually which check functions are done for each field device. Further, the user has to decide manually how to perform each check function, such as deciding which parameter to use, which results to read and how to determine analyses of the results.

For testing of each field device for each commissioning task, at least two persons, a field operator and a control room operator, have to be in close communication with each other during throughout the test procedure.

In an example of a linearization check shown in FIG. 2A, an engineer reads a linearization type of a field device manually from the physical field device using a device parameter reading tool. Then he reads an input signal conversion parameter in a control system, which is usually in a function block of the control system. Finally he analyses the readings and performs a comparison between the linearization type of the field device and the input signal conversion parameter to determine if the linearization configuration is correct.

In another example of a manual connection check shown in FIG. 2B, a control room operator views a graphical user interface ("GUI") while a field operator checks a physical field device. The control room operator requests the field operator to manually disconnect the field device from a network in the plant. After the field operator has disconnected the field device, he informs the control room operator of the disconnection. Upon receipt of the information of the disconnection, the control room operator then verifies from the GUI that the field device has been disconnected. When the disconnection is confirmed on the GUI, the control room operator requests the field operator to connect the field device to the network in the plant. Upon receipt of the request, the field operator manually connects the field device to the network in the plant. After the field operator has connected the field device, he informs the control room operator of the connection. Upon receipt of the information of the connection, the control room operator then verifies from the GUI that the field device has been connected. Both the field operator and the control room operator have to update each other as done for the disconnection and connection processes. Both the control room operator and the field operator communicate with each other using a remote communication device such as a walkie-talkie. It is tedious for both the control room operator and the field operator to be in constant communication for every step.

In a typical plant, there are hundreds of field devices, commissioning requires a lot of manpower and time. When new equipment is added to that a plant, if the area is hazardous, extra coordination efforts will be required during the commissioning process.

For each check function, a user needs to determine values to be set and/or configured on a field device. When there are multiple check functions to be performed on the field device, the user has to decide the sequence of settings and/or configurations of the test values manually. A different sequence from a proper sequence may result in errors or inaccurate test results. Manual actions, such as setting and configuration of test values, are prone to introducing human error and time consuming. Documentation of check functions which have been completed and test results are done manually.

There is a need for an improved method and system for performing commissioning of field device.

SUMMARY

A field device commissioning system includes, but not limited to, a commissioning tool, which is configured to communicate with a field device and a repository. The commissioning tool is configured to retrieve at least one property from a field device. The commissioning tool is configured to determine, from a registration file in the repository, if the retrieved at least one property is in the registration file. When the retrieved at least one property is determined to be in the registration file, perform a first test. When the retrieved at least one property is determined to be not in the registration file, determine, from a control system loop information file in the repository, if the retrieved at least one property is for a predetermined field device. When the retrieved at least one property is determined to be for the predetermined device, perform a second test different from the first test. When the retrieved property is determined to be not for the predetermined device, perform a third test different from the first and second tests.

BRIEF DESCRIPTION OF THE DRAWINGS

FIG. 5 is a table showing an example of a judgment table to be used for determining a linearization check result in commissioning according to some embodiments of the present invention.

DETAILED DESCRIPTIONS

Reference will now be made in detail to the preferred embodiments of the invention, examples of which are illustrated in the accompanying drawings. While some aspects of the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed descriptions of the present invention, numerous specific details are set forth in order to provide a thorough understanding of the present invention. However, it will be obvious to one of ordinary skill of the art that the present invention may be practiced without these specific details. In other instances, well known methods, procedures, components, and features have not been described in detail as not to unnecessarily obscure aspects of the present invention.

In some embodiments of the present invention, a field device commissioning system is described using the most commonly used check functions, such as connection check, range comparison check, linearization check, input loop check and output loop check. In general, these check functions can be automated by any available tools. A manual check, which is another type check function that allows a user to create instructions for tasks which cannot be automated by any tool, is also included in the descriptions.

Firstly, tasks are used to define a unit of work or procedure. One check function is defined by one task. When a check function is defined by one task, the defined task is associated with that check function.

Figure 1:
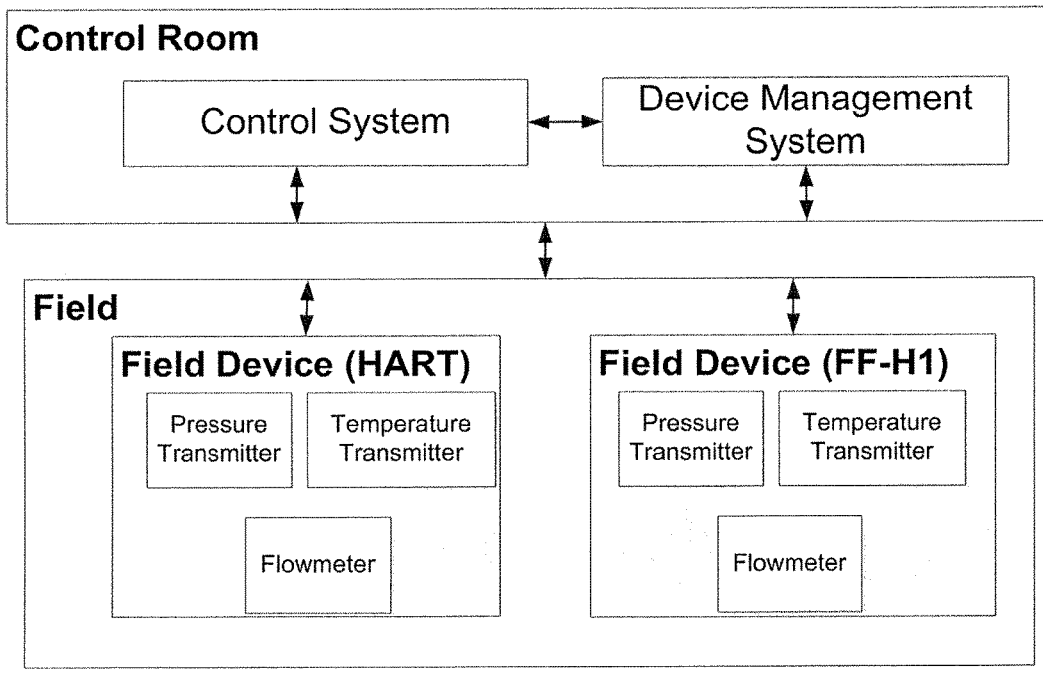
FIG. 1 is a block diagram of a plant management and control system in the related art.
Figure 2A:
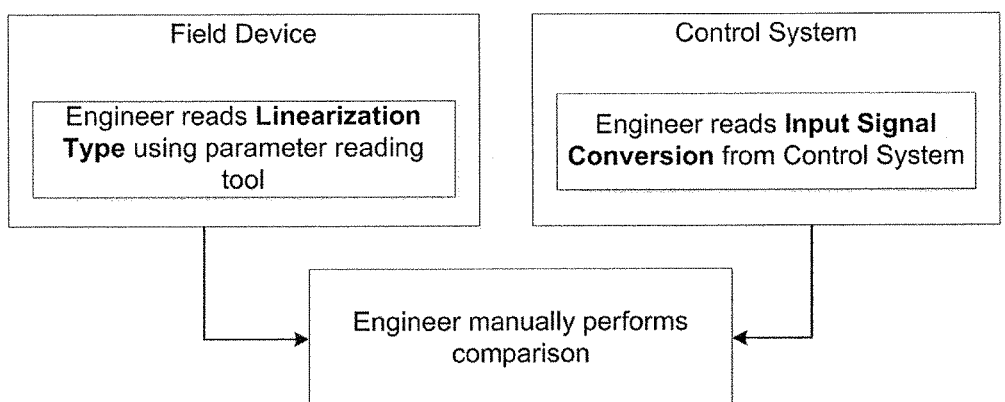
FIGS. 2A and 2B are process workflows in the related art.
Figure 2B:
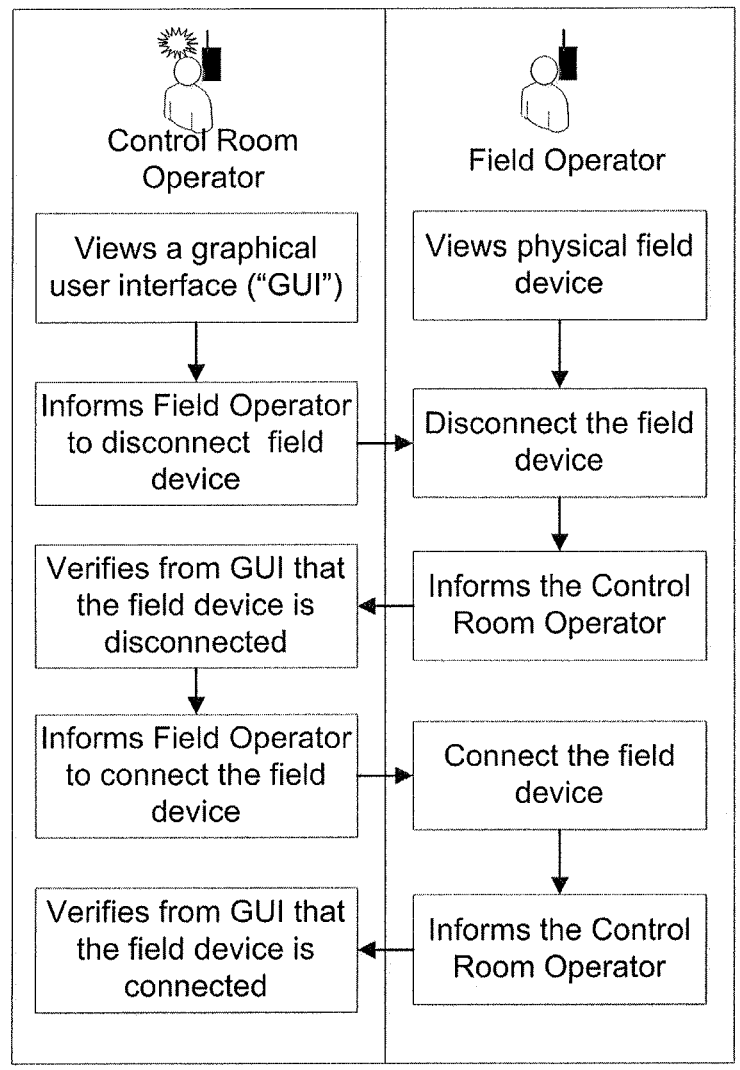
Figure 3:
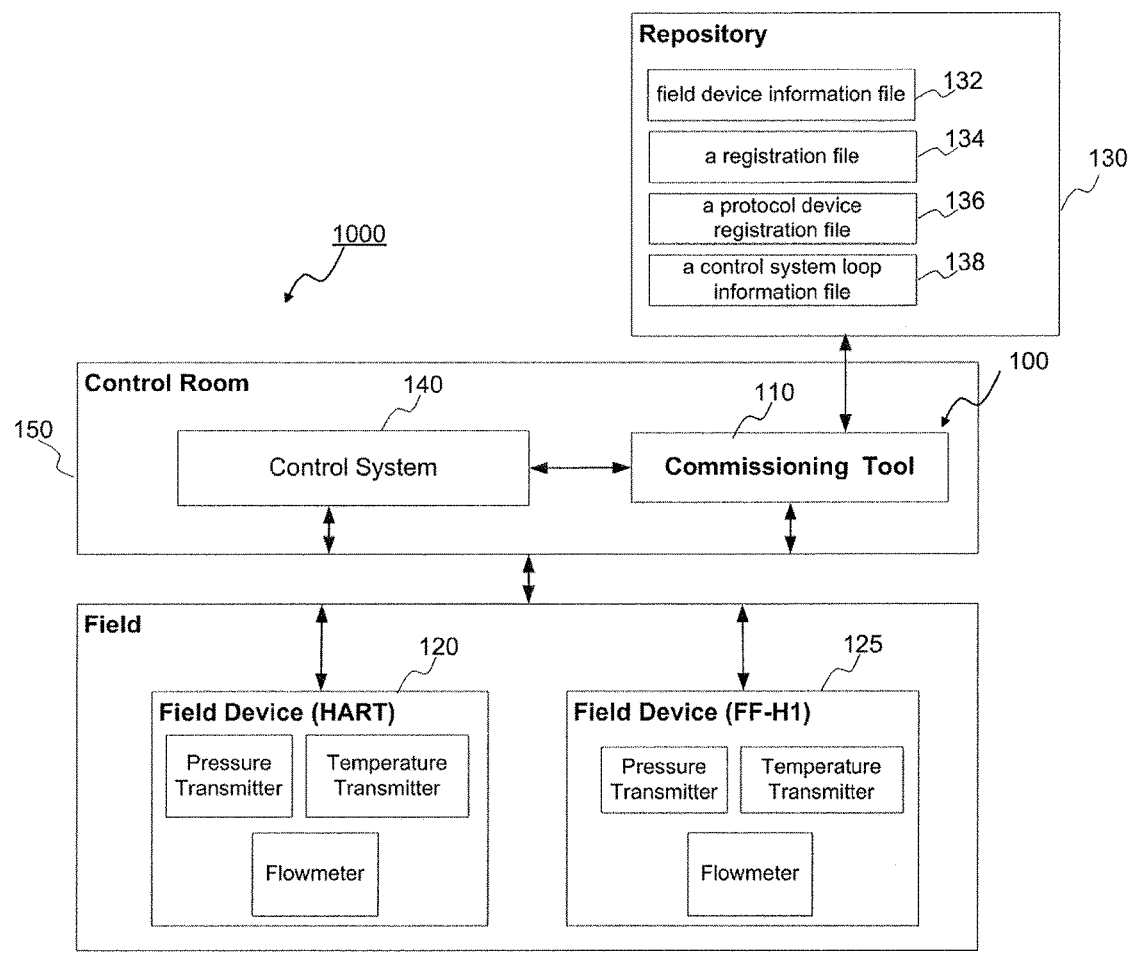
FIG. 3 is a block diagram of configurations of a field device management system including a field device commissioning system according to some embodiments of the present invention.

FIG. 3 is a block diagram of a field device management system 1000 in some embodiments of the present invention. The field device management system 1000 includes field devices 120 and 125, a control system 140, a field device commissioning system 100, and a repository 130. The control system 140 is configured to communicate with the field devices 120 and 125 in the field and to control the field devices 120 and 125. The field device commissioning system 100 is configured to communicate with the control system 140, the repository 130 and the field devices 120 and 125. The field device commissioning system 100 is configured to refer files stored in the repository 130 and to perform automatic commissioning processes for the field device 120 or 125. The field device commissioning system 100 includes at least a commissioning tool 110 which is configured to communicate with the field device 120 or 125 and with the repository 130 as well as with the control system 140. The commissioning tool 110 is configured to refer files stored in the repository 130 and to perform automatic commissioning processes for the field device 120 or 125. The commissioning tool 110 can be implemented by software in combination with hardware. In general, the control system 140 and the field device commissioning system 100 may be placed in a control room 150. In some cases, the field device commissioning system 100 may include the repository 130 in addition to the commissioning tool 110. In other cases, the field device commissioning system 100 may not include the repository 130, where the repository 130 may be in a separate system or a server of a remote location.

In general, the repository 130 may be configured to have a field device information file 132, a registration file 134, a protocol device registration file 136, a control system loop information file 138 and any other temporary or permanent files, if any.

The field device information file 132 has a list of field devices which are configured to be in communication with the field device commissioning system 100, and describes multiple properties for each field device. Examples of the multiple properties are "device tag", "device model", "device ID", "manufacturer/vendor ID" and "revision No".

The registration file 134 lists, for each field device, device communication commands which are to be executed to the respective field device 120, 125 for a desired task or check function. The field device information file 132 can be referred by the commissioning tool 110 to allow the commissioning tool 110 to perform a task to identify a type of the field device, for example, whether the field device is a pressure transmitter, a temperature transmitter or a flowmeter. The registration file 134 can be referred by the commissioning tool 110 to allow the commissioning tool 110 to identify a device communication command "HART Command 54", and then to execute it to the HART field device.

The protocol device registration file 136 lists field devices which are registered in a respective protocol database. In some cases, the protocol device registration file 136 may include only field devices which are pressure transmitters. For example, HART field devices may be registered with HART communication foundation. A HART field device registration file is created from HART field devices which are registered with the HART communication foundation. For Foundation Fieldbus H1 ("FF-H1") field devices which are registered in the Fieldbus foundation, a corresponding FF-H1 registration file is created. The protocol device registration file 136 can be implemented as separate files, one for each protocol. Alternatively, the protocol device registration file 136 can be implemented as one file including field devices registered in all protocols with a suitable identifier to distinguish the respective protocols for the respective field devices.

The control system loop information file 138 lists, for each field device, the respective configuration parameters in the control system 140. In the control system 140 which has function blocks, the function blocks information and association of function with the field devices are included in the control system loop information file 138. The association of the function blocks with the field devices is included as a mapping table. The control system loop information file 138 is updated to the repository 130 when required, such as for each change in any field device or configuration parameters in the control system 140. The update is done by importing the control system loop information file 138 as the need arises.

Connection Check

In one embodiment of the invention to perform a connection check, the commissioning tool 110 is configured to retrieve at least one property from the field device 120 or 125. The retrieved property of the field device 120 or 125 can be any one of "device tag", "device model, "device ID", "manufacturer/vendor ID" and "revision No". Preferably, the retrieved properties are "device model", "manufacturer/vendor ID" and "revision No". If the at least one property is retrieved successfully, this confirms that the commissioning tool 110 is connected to either one of the field devices 120 and 125. However, there is a need to confirm if the correct connection is established between the commissioning tool 110 and the correct one of the field devices 120 and 125.

The commissioning tool 110 is configured to compare the retrieved property and those properties in the field device information file 132 to determine if there is any match between the retrieved property and the properties in the field device information file 132. If more than one property is retrieved, all the retrieved properties are compared to the properties in the field device information file 132. The commissioning tool 110 is determined to be correctly configured to communicate with an expected one of the field devices 120 and 125, if the commissioning tool 110 determines that there is a match.

The commissioning tool 110 is also configured to compare the retrieved property with those in the registration file 134 to determine if there is any match between the retrieved property and the properties in the registration file 134. The commissioning tool 110 is configured to perform a first test which is a display test when the commissioning tool 110 determines that there is a match between the retrieved property with those in the registration file 134. The display test is considered successful when a desired output is shown on the display of the field device. Since the display unit is usually a liquid-crystal display, this test is also referred to as the LCD test.

LCD Test for HART Field Device

To perform the LCD test for a HART field device, the commissioning tool 110 is configured to identify a device communication command, from the registration file 134, which is suitable for performing the LCD test. The commissioning tool 110 is further configured to execute the identified device communication command to the field device, and retrieve a response from the field device. This response is the same as an output which the field device generates on the LCD display. The commissioning tool 110 is configured to generate an output of the retrieved response to be supplied to a user interface in the control room 150 to a control room operator to see the results of the LCD test on the user interface without communicating with a field operator. This will improve the efficiency of the connection test in terms of time and manpower. The field operator can view the output of the retrieved response on the LCD display of the field device too.

LCD Test for FF-H1 Field Device

To perform the LCD test for a FF-H1 field device, the commissioning tool 110 is configured to identify a parameter index and a parameter index value from the registration file 134 using the retrieved at least one property of the field device, thereby retrieving the identified parameter index and the parameter index value. The commissioning tool 110 is further configured to execute a write command to the field device. The write command is to write the retrieved parameter index value to the retrieved parameter index of the field device. If the write command fails to write to the parameter index, an error message is sent to the commissioning tool 110. The commissioning tool 110 is configured to detect an error message. When the error message is detected by the commissioning tool 110, a predefined error message is supplied from the commissioning tool 110 to the user interface in the control room 150. If the write command writes successfully, the field device generates a desired output on the LCD display. An example of the desired output is a preset pattern. When no error message is detected by the commissioning tool 110, the commissioning tool 110 is configured to generate the preset pattern to be supplied to the user interface in the control room 150.

Thus, the commissioning tool 110 in cooperation with the user interface will allow a control room operator to see the results of the LCD test on the user interface without communicating with a field operator. This will improve the efficiency of the connection test in terms of time and manpower. The field operator can view the output of the retrieved response on the LCD display of the field device too.

The commissioning tool 110 is configured to perform the following referring and determining processes, if the commissioning tool 110 determines that there is no match between the retrieved property with those in the registration file 134. The commissioning tool 110 is configured to refer a communication protocol of the field device from a control system loop information file 138 in the repository 130, and to determine if the retrieved property is for a predetermined field device, such as a HART field device. A HART field device uses HART communication protocol. The commissioning tool 110 is configured to perform a second test which is different from the first test, when the commissioning tool 110 determines that the retrieved property is for a predetermined field device. The commissioning tool 110 is then configured to execute a predetermined device communication command, such as "HART command 72", to the field device. This command is for performing a SQUAWK test on a HART field device. A HART field device usually generates a visual, audible, or mechanical response to a successful SQUAWK test. The commissioning tool 110 is configured to receive a response from the field device and supply the response to a user interface in the control room 150. Similar to the LCD test, the commissioning tool 110 in cooperation with the user interface will allow a control room operator to see the results of the LCD test on the user interface without communicating with the field operator. This will improve the efficiency of the connection test in terms of time and manpower. The field operator can be notified by the output of the field device, such as from "SQUAWK" being displayed on the LCD display, too.

The commissioning tool 110 is configured to perform a third test which is different from the first and second tests if the commissioning tool 110 determines that the retrieved property is not for a predetermined device. In the third test, the commissioning tool 110 is configured to generate a first instruction on a user interface to disconnect the field device from the field device commissioning system 100. The commissioning tool 110 is configured to receive a first response from the field device, when the field operator has completed the first instruction. An example of the first response is a message that the field device has been disconnected from the field device commissioning system 100.

The commissioning tool 110 is further configured to generate a second instruction on the user interface to connect the field device to the field device commissioning system 100. The commissioning tool 110 is configured to receive a second response from the field device when the field operator has completed the second instruction. An example of the second response is a message that the field device has been disconnected from the field device commissioning system 100. The commissioning tool 110 is further configured to determine a status of the field device based on the first or second response and generate an output of the determined status to be supplied to the user interface. Optionally, the third test can be repeated multiple times.

For each of the first, second and third tests, the commissioning tool 110 is configured to provide an option to the user interface to acknowledge a test result. If there is an error on performing the test, the test result is "Failed" and no acknowledgement option is provided by the commissioning tool 110. The commissioning tool 110 may be configured to make the user interface request the user to acknowledge the test result when the test is completed without an error. This is to ensure that the test has been completed successfully.

The commissioning tool 110 is configured to identify a test result as "Failed". Examples of such cases are: (1) when there is no property retrieved from the field device, (2) there is no match for the retrieved property with those in the field device information file 132. When the commissioning tool 110 identifies a test result as failed, the commissioning tool 110 provides a test result "Failed" to the user interface and the test result is updated in a temporary or permanent file in the repository 130.

Figure 4:
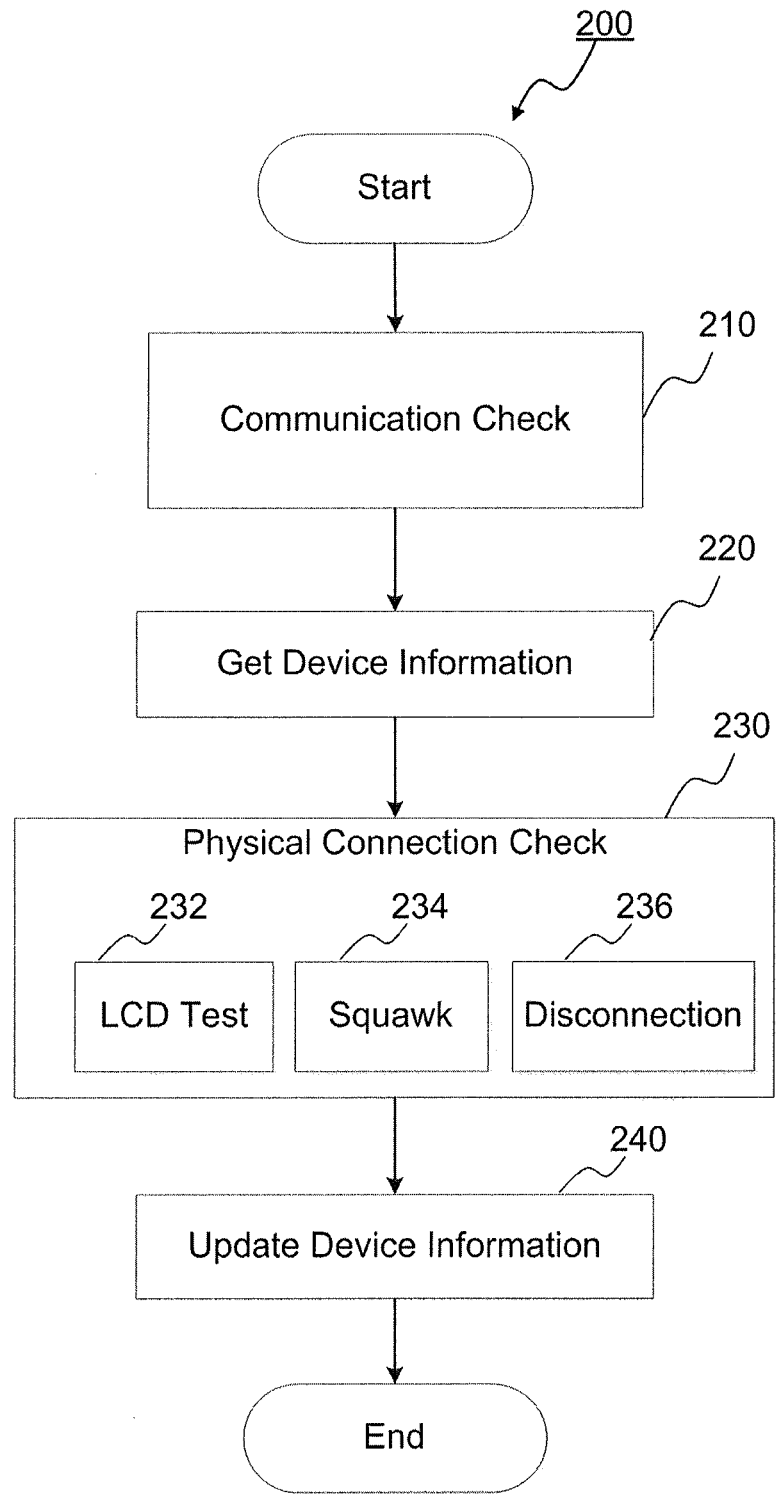
FIG. 4 is a connection check workflow according to some embodiments of the present invention.

FIG. 4 is a connection check workflow 200 which is a method of operation for a connection check function according to one embodiment of the invention, performed in the field device commissioning system 100. In Step 210, the commissioning tool 110 retrieves at least one property from the field device 120 or 125 to check if the commissioning tool 110 can communicate with the field device 120, 125. This is to determine if the Commissioning Tool 110 is connected to the field device 120, 125. When the property is retrieved successfully, the commissioning tool 110 is determined to be connected to the field device 120, 125.

In Step 220, by the commissioning tool 110, the at least one retrieved property from the field device is compared with properties in a field device information file 132 to determine if there is any match. When there is a match, the operation will go on to Step 230. In Step 230, by the commissioning tool 110, at least one of the retrieved property is compared with properties in the field device information file 132 to determine if there is a match.

When the commissioning tool 110 determines that there is a match in Step 230, then proceed to Step 232 to perform the first test by the commissioning tool 110. In the first test, the steps by the commissioning tool 110 are to identify, from the registration file 134, a device communication command for the field device which is associated with the retrieved property. Then the commissioning tool 110 executes the identified device communication command to the field device. After executing the device communication command, the commissioning tool 110 receives a response from the field device and generates an output of the received response to be supplied to the user interface.

When there is no match in Step 230, the commissioning tool 110 compares a communication protocol of the field device with that in the control system loop information file 138 to determine if the communication protocol is for a predetermined field device, such as a HART field device. When the communication protocol is determined to be for the predetermined field device, then proceed to Step 234 to perform a second test which is different from the first test.

In the second test, the commissioning tool 110 executes a predetermined device communication command to the field device. When the field device is a HART field device, the commissioning tool 110 executes a "HART Command 72". When the field device receives the predetermined device communication command, the field device generates one of a visual, audible or mechanical response, such as display of "SQUAWK" on field device LCD display, which can be received by a field operator. In addition, the operation further includes receiving from the field device a response to the executed device communication command and generating an output of the received response to be supplied to the user interface.

When by the commissioning tool 110 the communication protocol is determined to be not for the predetermined field device, then proceed to Step 236 to perform, by the commissioning tool 110, a third test which is different from the first and second tests. In the third test, the method by the commissioning tool 110 is to generate a first instruction on a user interface to disconnect the field device from the field device commissioning system 100. The control room operator communicates this to the field operator. After the field operator has completed the disconnection, the next step by the commissioning tool 110 is to receive a first response from the field device and generate a second instruction on the user interface to connect the field device 120, 125 to the field device commissioning system 100. Similarly, the control room operator communicates this to the field operator.

After the field operator has completed the connection, the operation by the commissioning tool 110 continues to determine a status of the field device 120, 125 based on the second response and generates an output of the determined status to be supplied to the user interface.

For each of the first, second and third tests, if the tests are completed without errors by the commissioning tool 110 and the user has acknowledged the test result as being "Passed", Step 240 updates the commissioning tool 110 determines if an update on device properties to the field device information file 132 in the repository 130 is necessary. When an update is necessary, the device information is retrieved by the commissioning tool 110 from the field device for the update of the field device information file 132 in the repository 130. This is useful to have updated device properties in the field device information file 132 for other check functions, such as linearization check. It would be also useful for other applications in the device monitoring system, control system or any other systems.

The above embodiments of the invention support automation of field device communication check, field device information check and update. By automation, human errors are reduced. Further, an embodiment of the invention may automatically select one of at least three predetermined tests based on field device information, which also improves the accuracy of the test results. Since prior configuration is done, the checks are done and results are recorded automatically. Advantageously, the manpower is reduced and accordingly there is time and cost savings. With the reduction of the need for manual field operations, there is reduced risk for field operators.

Linearization Check

Another embodiment of the invention is to perform a linearization check on a field device 120, 125. The commissioning tool 110 is configured to determine, from the control system loop information file 138, if the field device 120, 125 is configured as an input device. This is based on reading a configuration parameter in the control system loop information file 138. Preferably, the configuration parameter describes a connection type of the field device. For example, if the connection type is "IN", then it is determined to be configured as an input device, if the connection type is "OUT", then it is configured as an output device.

In an alternative, the connection type of the field device can be determined by retrieving a configuration parameter value from the control system 140. The configuration parameter is "Connection Type". For example, if the connection parameter value is "IN", then it is determined to be configured as an input device. If the connection parameter value is "OUT", then it is configured as an output device.

When the field device is determined to be configured as the input device, the commissioning tool 110 determines from the protocol device registration file 136, if the field device is a pressure transmitter. Based on the communication protocol of the field device in the control system loop information file 138, the commissioning tool 110 identifies the communication protocol of the field device.

When the identifier of the field device is not in the protocol device registration file 136, the determination cannot be done. Examples of an identifier are "Device Model" and "Manufacturer/Vendor ID". The commissioning tool 110 is configured to retrieve information from other sources which are suitable to determine if the field device 120, 125 is a pressure transmitter.

For a HART Field Device

For a HART field device, the commissioning tool 110 is further configured to identify, from the registration file 134, a predetermined device command for retrieving the information. The commissioning tool 110 is configured to execute the identified predetermined device command to the field device, receive a response from the field device and determine if the field device is a pressure transmitter from the received response.

In a first example, the predetermined command is "HART Command 54". The response is a package which includes many bytes. The response byte 21 represents "Device Variable Family". When the response byte 21 has a value "5", then the field device is determined to be a pressure transmitter device. Alternatively, the determination can be done from a response byte 22 which represents "Device Variable Classification". When the response byte 22 has a value "65", the field device is determined to be a pressure transmitter.

In a second example, the predetermined command is "HART Command 1". If the HART field device is revision 7 or any earlier revision, and the response value is within ranges of "1-14", "145", "237-239", the field device is determined to be a pressure transmitter. If the HART field device is revision 6 and 7, and the response value is also within a range "170-179", the field device is determined to be a pressure transmitter.

Yet another alternative is to configure the commissioning tool 110 to read a predetermined variable in a database 160 (not shown) in the commissioning tool. An example of the database 160 is an object linking and embedding (OLE) for process control ("OPC") database which reads field device parameters periodically and updates in the database 160. In this example, the commissioning tool 110 is configured to read the predetermined variable which represents an engineering unit, "_PV_Unit". If the value is within ranges of 1-14, 145, 237-239, the field device is determined to be a pressure transmitter. If the HART field device is of revision 6 and 7, and the response value is also within a range "170-179", the field device is determined to be a pressure transmitter.

In a preferred embodiment, if the response is not sufficient to determine if the field device is a pressure transmitter device, the commissioning tool 110 is configured to determine using any predetermined methods. In a third example, the first and second examples are implemented together sequentially.

For FF-H1 Field Device

For a FF-H1 field device, the commissioning tool 110 is further configured to read a predetermined variable in the database 160. An example of the database 160 is an object linking and embedding (OLE) for process control ("OPC") database which reads field device parameters periodically and updates in the database 160. In this example, the commissioning tool 110 is configured to read the predetermined variable which represents a standard parameter, "_TB01.TRANSDUCER_TYPE". When value of the standard is "100", the field device is determined to be a pressure transmitter.

Alternatively, the commissioning tool 110 is further configured to retrieve a predefined parameter from the field device. The commissioning tool 110 is configured to identify from the registration file 134 a predetermined device command for retrieving the information. The commissioning tool 110 is configured to execute the identified predetermined device command to the field device, receive a response from the field device and determine if the field device is a pressure transmitter from the received response. For example, the commissioning tool 110 is configured to execute "parameter index" which indexes to a standard parameter, "_TB01.TRANSDUCER_TYPE". When response is "100", the field device is determined to be a pressure transmitter.

Identify Exceptional Pressure Transmitter

Some field device manufacturer/vendor of pressure transmitters have included additional functionalities such as mass-flow conversion, or additional parameter to configure the usage of the field device. Such field devices are considered exceptional pressure transmitters. Therefore, it is preferable to identify the manufacturer/vendor and device model of such exceptional pressure transmitters to improve accuracy of performing linearization check automatically. The manufacturer/vendor and device model are identified from field device parameters such as "Manufacturer/Vendor ID" and "Device Type".

(a) Preferably, the commissioning tool 110 is further configured to determine if the field is an exceptional pressure transmitter, by identifying if the field device has any one of following parameters or combination of parameters:
  (1) For a HART field device, a "Manufacturer/Vendor ID" parameter is 0x000037 and "Device Type" parameter is 0x3754.
  (2) For a FF-H1 field device, a "Manufacturer/Vendor ID" parameter is 0x594543 and "Device Type" parameter is 0x000E.

(b) Still preferably, when the field device is identified to have the parameters in above (3) and (4), the commissioning tool 110 is configured to determine, from the field device, if the field device is configured to measure flow.

For a HART field device, the commissioning tool 110 is configured to determine, from the registration file 134, the predetermined device communication command. In this case, the predetermined device communication command is "HART COMMAND 172". When the commissioning tool 110 receives a response "0x02", the field device is configured to measure the flowrate.

For a FF-H1 field device, the commissioning tool 110 is configured to retrieve, from the field device, the value for parameter "_TB01.PRIMARY_VALUE_TYPE" or is "_TB01.LINEARIZATION". When the value is "0xfff2" for the former and "0x02" for the latter, the field device is configured to measure the flowrate.

To Check if Field Device Is Configured to Measure Flow

When the field device is determined to be a pressure transmitter, the commissioning tool 110 is further configured to determine, from the control system loop information file 138, if the field device is configured in the control system 140 to measure flow.

An example of determination is by reading an engineering unit of a process variable which the field device is configured to measure. If the engineering unit is defined in terms of volume per time unit, such as cubic meter per second, minute, hour or day, the field device is configured in the control system 140 to measure flow.

Another example of determination is by reading parameter "Tag Name". When the value of parameter "Tag Name" has any of the following characters "FI", "FFI", "FQI", "FZI", "FC", "FFC", "FQC", "FZIC", "FIC", "FFIC", "FQIC", "FZIC", "FRC", "FFRC", "FQRC" and "FZRC" in combination with other characters or numbers, the field device is configured in the control system 140 to measure flow.

Determine linearization Type of Field Device Configured in Control System

When the field device is determined to measure the predetermined process variable, the commissioning tool 110 is further configured to determine, from the control system loop information file 138, a linearization type 170 (not shown) in the control system 140 which is associated to the field device.

In an example, a configuration parameter "Input Signal Conversion", in the control system loop information file 138, for the field device has the value "Linear", and the linearization type is determined as "Linear"; for other values, the linearization type is "Other". There may be multiple values for the configuration parameter which represents the linearization type, such as "Linear", Square Root", "Indirect Square Root". Preferably, a mapping table is provided to enable the determination of the field device linearization type 170 in the control system. The mapping table lists information for configuration parameters in the control system. For example, to determine a linearization type of a field device in the control system, the linearization type is found in the value of "Input Signal Conversion". If the value is "Linear", then the linearization type is determined as "Linear". If the value is one of "Square Root", "Indirect Square Root", then the linearization type is determined as "Other".

Alternatively, the commissioning tool 110 is configured to retrieve configuration parameter value from the control system 140 to determine the linearization type 170.

For example, a configuration parameter "Input Signal Conversion", in the control system 140, for the field device has the value "No Conversion", the linearization type is determined as "Linear"; for other values, the linearization type is "Other". There may be multiple values for the configuration parameter which represents the linearization type, such as "No Conversion", "Square Root", "Indirect Square Root". Preferably, a mapping table is provided to enable the determination of the field device linearization type 170 in the control system. The mapping table lists information for configuration parameters in the control system. For example, to determine a linearization type of a field device in the control system, the linearization type is found in the value of "Input Signal Conversion". If the value is "No Conversion", then the linearization type is determined as "Linear". If the value is one of "Square Root", "Indirect Square Root", then the linearization type is determined as "Other".

Determine linearization Type of Field Device Configured in Field Device

The commissioning tool 110 is also configured to retrieve a linearization type 175 (not shown) of the field device from the field device.

For a HART field device, the commissioning tool 110 is further configured to identify from the registration file 134, a predetermined device communication command. In this case is "HART COMMAND 15", the commissioning tool 110 executes it to the field device, and receives a response from the field device.

For example, if the retrieved response from the field device has value "0" for parameter "pressure_output_transfer_function", the linearization type 175 of the field device is "Linear". For all other values, the linearization type 175 is "Other".

For a FF-H1 input field device, the commissioning tool 110 is further configured to read from the field device of Input type, parameter "_AI01.L_TYPE"; for an FF-H1 output field device is "_TB01.POSITION_CHAR_TYPE".

From the received response, the linearization type 175 of the field device is identified from the registration file 134. For example, input type field device parameter of "" _AI01.L_TYPE" with value "1" is a "Direct" field device, from the registration file 134, the linearization type 175 of the field device is identified as "Linear". For all other values, the linearization type 175 is "Other". Output field device parameter of "_TB01.POSITION_CHAR_TYPE" with value "1" is a "Direct" field device, from the registration file 134, the linearization type 175 of the field device is identified as "Linear". For all other values, the linearization type 175 is "Other".

Preferably, a mapping table is provided in the repository 138 to enable the determination of the field device linearization type 175 in the field devices to be done conveniently.

Linearization Check Result

The commissioning tool 110 is further configured to determine, using the linearization type 175 of the field device and the linearization type 170 of the field device in the control system 140, a linearization check result.

The linearization check result is determined, for the field device determined as described above, by applying predefined Logic in FIG. 5 and using one of the following Scenarios:

Scenario 1: For a field device which is configured as:
   1.1 Input device which is not pressure transmitter.
   1.2 Input devices which are exceptional pressure transmitters such as
      a. a HART field device, which has a "Manufacturer/Vendor ID" parameter is 0x000037 and "Device Type" parameter is 0x3754.
      b. a FF-H1 field device, which has a "Manufacturer/Vendor ID" parameter is 0x594543 and "Device Type" parameter is 0x000E.

Scenario 2: For a field device which is a pressure transmitter, the field device is configured to measure one of a process variable, pressure and level.

Scenario 3: For a field device which is pressure transmitter and configured to measure a flow process variable.

Scenario 4: For a field device which is a pressure transmitter and cannot be determined to be configured to measure a flow process variable.

Scenario 5: For a field device configured as output device which processes output signals to actuators, such as valves.

For Scenario 1, applying Logic 1 in FIG. 5, when both linearization types 170 and 175 are "Linear", then the linearization check result is good, represented by "OK" in FIG. 5. For other types of combination, the linearization check result is not good, which can be represented by "NG" in FIG. 5.

For Scenario 2, applying Logic 2, when both linearization types 170 and 175 are "linear", then a message is supplied on a user interface for the Control Room Operator to determine the linearization check, represented by "ACK" in FIG. 5. For other types of combination, the linearization check result is not good, represented by "NG" in FIG. 5.

For Scenario 3, applying Logic 3, when both linearization types 170 and 175 are the same, "Linear" or "Other", then the linearization check result is not good, represented by "NG" in FIG. 5. For other types of combination, the linearization check result is good, represented by "OK" in FIG. 5.

For Scenario 4, applying Logic 4, when both linearization types 170 and 175 are the same, "Linear" or "Other", then the linearization check result is not good, represented by "NG" in FIG. 5. For other types of combination, a message is supplied on a user interface for the control room operator to determine the linearization check, represented by "ACK" in FIG. 5.

For Scenario 5, applying Logic 5, when both linearization types 170 and 175 are "Other", then the linearization check result is good, represented by "OK" in FIG. 5. For other types of combination, the linearization check result is not good, represented by "NG" in FIG. 5.

Preferably, the commissioning tool 110 is further configured to determine the linearization check result using a judgment table 180 in the repository 130 or in the commissioning tool 110. An example of the judgment table 180 is illustrated in FIG. 5.

Figure 6:
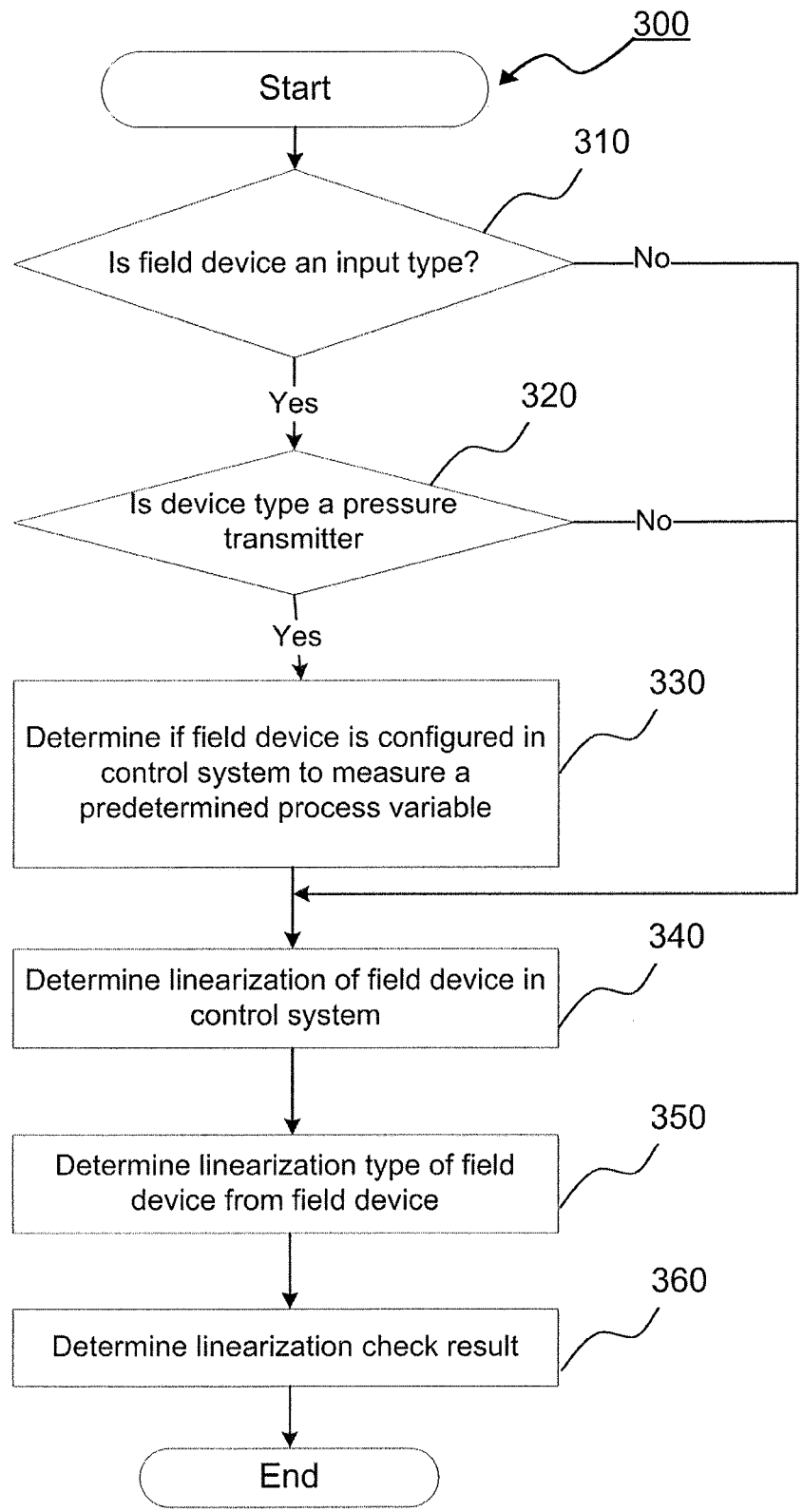
FIG. 6 is a linearization check workflow according to some embodiments of the present invention.

FIG. 6 is a linearization check workflow 300 which is a method of performing linearization check function according to one embodiment of the invention, in the field device commissioning system 100. In Step 310 the commissioning tool 110 determines, from a control system loop information file 138, if the field device is configured to use as an input device. The determination is done by verifying if the field device is using an input signal.

When the field device is determined to be the input device, in Step 320, the commissioning tool 110 determines, from a protocol device registration file 136, if the field device is a pressure transmitter.

When the field device is determined to be the pressure transmitter, in Step 330, from the control system loop information file 138, the commissioning tool 110 determines if the field device is configured in the control system 140 to measure flow.

When the field device is determined to measure the predetermined process variable, in Step 340, from the control system loop information file 138, the commissioning tool 110 determines a linearization type 170 of the field device which is configured in the control system 140. In Step 350, the commissioning tool 110 retrieves a linearization type 175 of the field device from the field device.

In Step 360, the commissioning tool 110 determines a linearization check result by using the linearization types 170, 175.

The above embodiments of the invention enable automatic retrieval, analysis and comparison of linearization types 170,175 of field devices configured in the control system 140 and the field device 120, 125. By automation, human errors are reduced. Since prior configuration is done, the checks are done and results are recorded automatically. Advantageously, the manpower is reduced and accordingly there is time and cost savings. With the reduction of the need for manual field operations, there is reduced risk with less field operators required.

Automatic Generation of Tasks

Another embodiment of the invention is that the commissioning tool 110 is configured to provide a user interface with at least one template of multiple templates in the repository 130. The multiple templates in the repository 130 are task templates and workflow templates. A task template is a task which is saved as a template. Accordingly, a workflow template is a workflow which is saved as a template.

Further a task or workflow template includes a predefined value for the task. For a task which has a configuration with multiple values, there are predefined values for the configuration. Preferably, an option is provided to change the predefined value.

A user, such as the control room operator, can select any of the task or workflow templates provided on the user interface.

The commissioning tool 110 is configured to determine check functions for at least one of the plurality of field devices. To determine check functions, the commissioning tool 110 is configured to read configuration parameters in the control system loop information file 138, or parameters in the field device information file 132. Both files are in the repository 130.

The commissioning tool 110 is configured to retrieve identifiers of the field devices 120, 125 in the field device information file 132. Using the identifiers, from the control system loop information file 138, the commissioning tool 110 determines if the field devices 120, 125 are associated or connected to the control system 140.

In the control system 140 which has a function block 190 (not shown) for connection to field devices. Preferably, it is further configured to determine if the field devices 120, 125 are associated or connected to a function block 190 in the control system 140.

The commissioning tool 110 is configured to determine check functions, associated with the selected task template or workflow template, for the field devices 120, 125. In an example, the check functions are determined by using the following predetermined criteria in the respective sequence:

Sequence 1 is a "Connection Check Function" and the criteria are:
  (a) Communication protocol of the field device is "HART" or "FF-H1", and
  (b) Connection type of the field device is "Input" or "Output".

Sequence 2 is a "Linearization Check Function" and the criteria are:
  (a) Field device is associated with the control system or function block in the control system,
  (b) Communication protocol of the field device is "HART" or "FF-H1", and
  (c) Connection type of the field device is "Input" or "Output".

Sequence 3 is a "Range Check Function" and the criteria are:
  (a) For HART field device, it is associated with the control system or function block in the control system,
  (b) Communication protocol of the field device is "HART" or "FF-H1", and
  (c) Connection type of the field device is "Input" or "Output".

Sequence 4 is an "Input Loop Check Function" and the criteria are:
  (a) Field device is associated with the control system or function block in the control system,
  (b) Communication protocol of the field device is "HART" or "FF-H1", and
  (c) Connection type of the field device is "Input".

Sequence 5 is an "Output Loop Check Function" and the criteria are:
  (a) Field device is associated with the control system or function block in the control system,
  (b) Communication protocol of the field device is "HART" or "FF-H1", and
  (c) Connection type of the field device is "Output".

Sequence 6 is a "Manual Work Check Function" and the criteria are:
  (a) Communication protocol of the field device is "HART" or "FF-H1", and
  (b) Connection type of the field device is "Input" or "Output".

A summary of the criteria is provided in the Table 1 below.

TABLE 1

| | | Criteria (AND) | | |
|---|---|---|---|---|
| Sequence | Check Functions | Is Field Device associated to Control System Function Block? | Communication Protocol of the Field Device | Connection Type of the Field Device |
| 1 | Connection Check | N/A | HART, FF H1 | Input, Output |
| 2 | Linearization Check | YES | HART, FF H1 | Input, Output |
| 3 | Range Check | YES for HART N/A for FF-H1 | HART, FF H1 | Input, Output |
| 4 | Input Loop Check | YES | HART, FF H1 | Input |
| 5 | Output Loop Check | YES | HART, FFH1 | Output |
| 6 | Manual Work Check | N/A | HART, FF H1 | Input, Output |

If the criteria are not satisfied, the corresponding check function is not created. This prevents irrelevant check functions from being executed, thus avoiding errors due to execution of irrelevant check functions. Check functions may be omitted from a sequence for a field device if the criteria are not satisfied. The sequence is the order for performing the generated check functions. This creates a standardized sequence to reduce error due to illogical sequence. The order of the sequence is such that Sequence 1 is done first and Sequence 6 last.

The commissioning tool 110 is configured to provide a user interface with information which identifies the field devices for selection. The information is an identifier or a symbol which represents the field device.

The commissioning tool 110 is configured to provide a user interface with group types for selection. The group types are stored in the repository 130. This is to generate the tasks in a group type according to preference of the user. An example of a group type is folder for an area, a process, equipment or unit; another group type is check function, user, team, and field devices.

Based on the selected template and group type, tasks associated with the determined check functions are generated automatically. The generated tasks are provided on the user interface with information about the generated tasks. Preferably, the user interface is provided with the generated tasks and the user interface is provided with an option to re-select the group type.

Preferably, the generated check functions are filtered using the earlier selected template. In this case, tasks are generated for a selected single task template or workflow template.

Figure 7A:
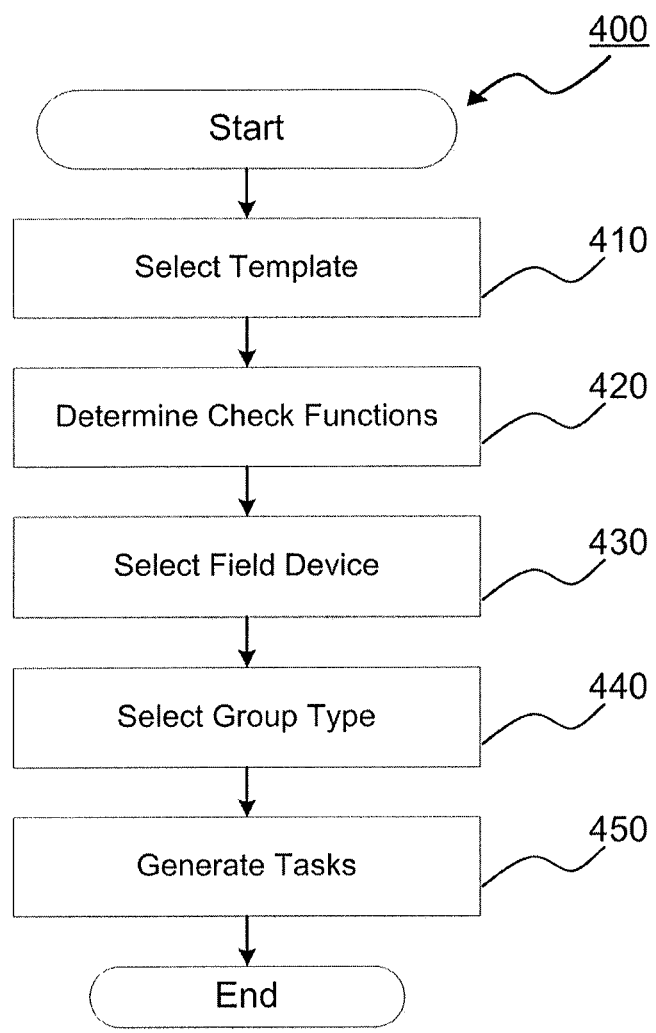
FIGS. 7A and 7B are views which each illustrate an automatic generation of tasks workflow according to some embodiments of the present invention.

FIG. 7A is a flow chart of a method 400 for automatically generating tasks for a plurality of field devices according to an embodiment of the invention. In Step 410, the commissioning tool 110 provides a user interface with at least one template in the repository 130 for selection. Preferably, all the templates in the repository 130 are provided.

In Step 420, at least one control system parameter is used to determine which check functions are associated with the field device. The control system parameter is retrieved from either the control system loop information file 138 or the field device information file 132 in the repository 130. Not all check functions in the selected template can be applied to all types of field devices. Based on the selected template in Step 410, predefined criteria such as those in above Table 1 are used to determine the check functions. This prevents irrelevant check functions from being executed, thus avoiding errors due to execution of irrelevant check functions.

In Step 430, the commissioning tool 110 provides the user interface with information which identifies at least one of the plurality of field devices for selection. Preferably, information for all the field devices are provided. Then in Step 440, the commissioning tool 110 provides the user interface with information which identifies at least one of a plurality of group types in the repository for selection. Preferably, information for all the group types are provided. In Step 450, the commissioning tool 110 generates, using the selected template and selected group type, tasks associated with the check functions.

Figure 7B:
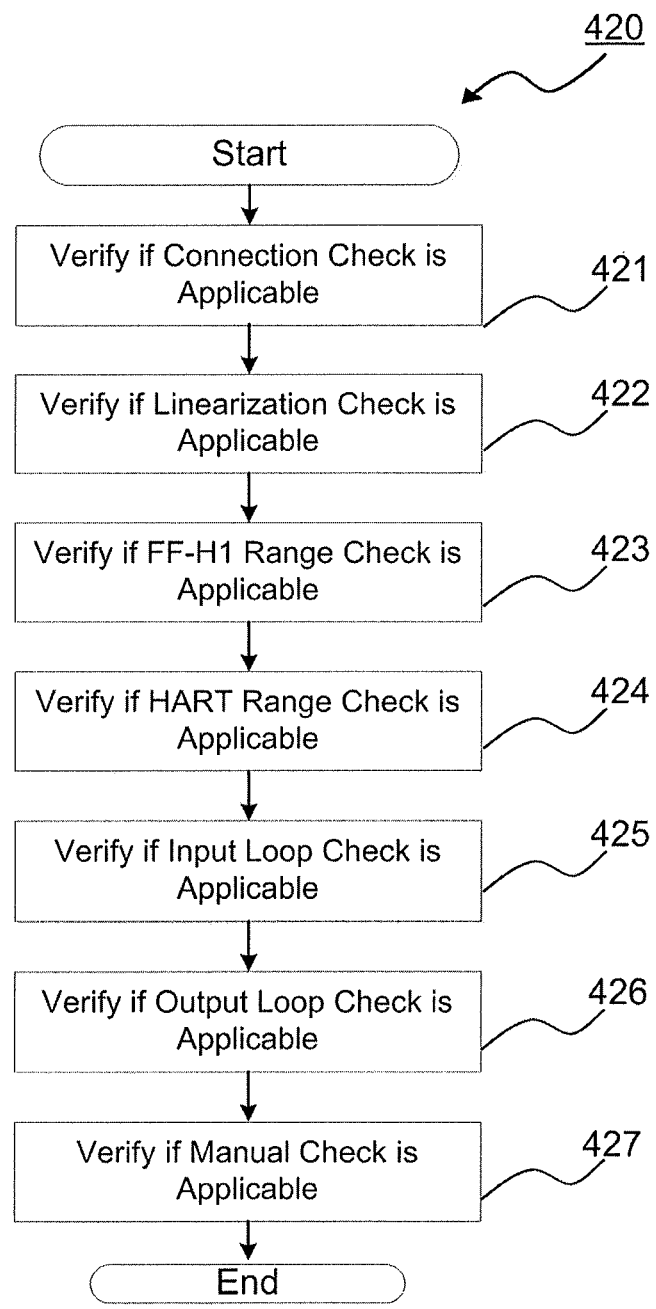

FIG. 7B is an example of workflow for performing step 420. In Step 421 the commissioning tool 110 verifies if a connection check is applicable by using criteria for sequence 1 in Table 1. Step 422 verifies if a linearization check is applicable by using criteria for sequence 2 in Table 1. In Steps 423 and 424 the commissioning tool 110 verifies if a FF-H1 range check and HART range check are applicable by using criteria for sequence 3 respectively in Table 1. In Steps 425 and 426, the commissioning tool 110 verifies if an input loop check and output loop check are applicable by using criteria for sequences 4 and 5 respectively in Table 1. In Step 427, the commissioning tool 110 verifies if a manual check in Sequence 6 is applicable.

The above embodiments of the invention enable automatic generation of tasks to be performed. The association of the task and check functions, check functions and field devices are done automatically. This reduces man efforts required to identify and verify the check functions and tasks. With automation, human errors are reduced.

Further a standardized sequence of check function is generated. By applying a standardized sequence of check function and automating the generation of the sequence, human errors are reduced. Since prior configuration is done, the checks are done and results are recorded automatically. Advantageously, the manpower is reduced and accordingly there is achieved time and cost savings. With the reduction of the need for manual field operations, there is reduced risk with less field operators required.

The commissioning tool is configured to determine, from a field device information file in the repository, if the retrieved at least one property is the same as any one of the properties in the field device information file.

In the field device commissioning system for performing the first test, the commissioning tool is configured to: identify, from the registration file, a device communication command for the field device based on the retrieved at least one property; execute the identified device communication command to the field device; receive, from the field device, a response to the executed device communication command; and generate an output of the received response to be supplied to a user interface.

In the field device commissioning system for performing the first test, the commissioning tool is configured to: identify, from the registration file, a parameter index and a parameter index value for the field device based on the retrieved at least one property; execute, to the field device, a write command to write the identified parameter index value to the identified parameter index of the field device; detect, from the field device, a response to the executed write command; determine, based on the detected response, the result of the executed write command; and generate, based on the determined result, an output of the received response to be supplied to a user interface.

In the field device commissioning system for performing the second test, the commissioning tool is configured to: execute a predetermined device communication command to the field device, when the field device receives this device communication command, the field device generates one of a visual, audible or mechanical response; receive, from the field device, a response to the executed device communication command; and generate an output of the received response to be supplied to a user interface.

In the field device commissioning system for performing the third test, the commissioning tool is configured to: generate a first instruction to be supplied to a user interface to disconnect the field device from the field device commissioning system; receive a first response from the field device based on the first instruction; generate a second instruction to be supplied to a user interface to connect the field device to the field device commissioning system based on the first response; receive a second response from the field device based on the second instruction; determine a status of the field device based on the second response; and generate an output of the determined status to be supplied to the user interface.

In the field device commissioning system, the retrieved property may include, but is not limited to, at least one of: Device Tag, Device ID, Device Model, Manufacturer ID and Device Revision.

The field device commissioning system may include a field device configured to communicate with the commissioning tool.

The commissioning tool is configured to provide an option to be supplied to a user interface to acknowledge the test result.

In another aspect of the invention, a field device commissioning method performed in a field device commissioning system may include, not limited to, a commissioning tool. The commissioning tool is configured to communicate with a field device and a repository. The field device commissioning method may include: retrieving at least one property from the field device; determining, from a registration file in the repository, if the retrieved property is in the registration file; when the retrieved property is determined to be in the registration file, performing a first test; when the retrieved property is determined to be not in the registration file, determining, from a control system loop information file in the repository, if the retrieved property is for a predetermined field device; when the retrieved property is determined to be for the predetermined field device, performing a second test different from the first test; and when the retrieved property is determined to be not for the predetermined device, performing a third test different from the first and second tests.

In the method for performing the first test, may include determining, from a device information file in the repository, if the retrieved at least one property is the same as any one of the properties in the device information file.

In the method for performing the first test, may include: identifying, from the registration file, a device communication command for the field device based on the retrieved at least one property; executing the identified device communication command to the field device; receiving, from the field device, a response to the executed device communication command; and generating an output of the received response to be supplied to a user interface.

The method for performing the first test may include: identifying, from the registration file, a parameter index and a parameter index value for the field device based on the retrieved at least one property; executing, to the field device, a write command to write the identified parameter index value to the identified parameter index of the field device; detecting, from the field device, a response to the executed write command; determining, based on the detected response, the result of the executed write command; and generating, based on the determined result, an output of the received response to be supplied to a user interface.

The method for performing the second test may include: executing a predetermined device communication command to the field device, when the field device receives this device communication command, the field device generates one of a visual, audible or mechanical response; receiving, from the field device, a response to the executed device communication command; and generating an output of the received response to be supplied to a user interface.

The method for performing the third test may include: generating a first instruction to be supplied to a user interface to disconnect the field device from the field device commissioning system; receiving a first response from the field device based on the first instruction; generating a second instruction to be supplied to the user interface to connect the field device to the field device commissioning system based on the first response; receiving a second response from the field device based on the second instruction; determining a status of the field device based on the second response; and generating an output of the determined status to be supplied to the user interface.

The method may include determining, from the field device information file, if the properties are to be updated, and when the properties are determined to be updated, retrieving the properties determined to be updated, and updating the properties to the field device information file.

In yet another aspect of the invention, a non-transitory computer readable medium that stores a computer program to be executed by a field device commissioning system to perform a field device commissioning method, the field device commissioning system may include, but is not limited to, a commissioning tool, the commissioning tool being configured to communicate with a field device and a repository. The field device commissioning method may include, but is not limited to: retrieving at least one property from the field device; determining, from a registration file in the repository, if the retrieved property is in the registration file; when the retrieved property is determined to be in the registration file, performing a first test; when the retrieved property is determined to be not in the registration file, determining, from a control system loop information file in the repository, if the retrieved property is for a predetermined field device; when the retrieved property is determined to be for the predetermined field device, performing a second test different from the first test; and when the retrieved property is determined to be not for the predetermined device, performing a third test different from the first and second tests.

What is claimed is:
1. A field device commissioning system, comprising a commissioning tool configured to communicate with a field device in an industrial facility or plant and a repository, wherein the commissioning tool comprises hardware and software components and is configured to improve the operation of the field device commissioning system and to:
retrieve at least one property from a field device;
compare the retrieved at least one property with properties in a field device information file in the repository;
determine if the retrieved at least one property is identical to at least one of the properties in the field device information file in the repository;
when the retrieved at least one property is determined to be identical to at least one of the properties in the field device information file in the repository, perform a first test which is a display test for the field devices;
when the retrieved at least one property is determined to be not identical to at least one of the properties in the field device information file in the repository, determine, from a control system loop information file in the repository, if the retrieved at least one property is for a predetermined field device;
when the retrieved at least one property is determined to be for the predetermined field device, perform a second test which is a communication test on the predetermined field device, different from the first test; and
when the retrieved at least one property is determined to be not for the predetermined device, perform a third test which is a field device state-determination test, different from the first and second tests, of determining a status of the field device.

2. The system in claim 1, wherein for performing the first test, the commissioning tool is configured to:
identify, from the registration file, a device communication command for the field device based on the retrieved at least one property;
execute the identified device communication command to the field device;
receive, from the field device, a response to the executed device communication command; and
generate an output of the received response to be supplied to a user interface.

3. The system in claim 1, wherein for performing the first test, the commissioning tool is configured to:
identify, from the registration file, a parameter index and a parameter index value for the field device based on the retrieved at least one property;
execute, to the field device, a write command to write the identified parameter index value to the identified parameter index of the field device;
detect, from the field device, a response to the executed write command;
determine, based on the detected response, the result of the executed write command; and
generate, based on the determined result, an output of the received response to be supplied to a user interface.

4. The system in claim 1, wherein for performing the second test, the commissioning tool is configured to:
execute a predetermined device communication command to the field device, when the field device receives this device communication command, the field device generates one of a visual, audible or mechanical response;
receive, from the field device, a response to the executed device communication command; and
generate an output of the received response to be supplied to a user interface.

5. The system in claim 1, wherein for performing the third test of determining the status of the field device, the commissioning tool is configured to:
generate a first instruction to be supplied to a user interface to disconnect the field device from the field device commissioning system;
receive a first response from the field device based on the first instruction;
generate a second instruction to be supplied to a user interface to connect the field device to the field device commissioning system based on the first response;
receive a second response from the field device based on the second instruction;
determine a status of the field device based on the first response or the second response; and
generate an output of the determined status to be supplied to the user interface.

6. The system in claim 1, wherein the retrieved at least one property comprises at least one of: Device Tag, Device ID, Device Model, Manufacturer ID and Device Revision.

7. The system in claim 1, further comprising: a field device configured to communicate with the commissioning tool.

8. The system in claim 1, wherein the commissioning tool is configured to further to provide an option to be supplied to a user interface to acknowledge the test result.

9. A field device commissioning method performed in a field device commissioning system comprising a commissioning tool, the commissioning tool comprising hardware and software components and being configured to improve the operation of the field device commissioning system and to with a field device in an industrial facility or plant and a repository, the method comprising:
retrieving at least one property from the field device;
comparing the retrieved at least one property with properties in a field device information file in the repository;
determining if the retrieved at least one property is identical to at least one of the properties in the field device information file in the repository;
when the retrieved at least one property is determined to be identical to at least one of the properties in the field device information file in the repository, performing a first test which is a display test for the field devices;
when the retrieved at least one property is determined to be not identical to at least one of the properties in the field device information file in the repository, determining, from a control system loop information file in the repository, if the retrieved at least one property is for a predetermined field device;
when the retrieved at least one property is determined to be for the predetermined field device, performing a second test which is a communication test on the predetermined field device, different from the first test; and
when the retrieved at least one property is determined to be not for the predetermined device, performing a third test which is a field device state-determination test, different from the first and second tests, of determining a status of the field device.

10. The method in claim 9, wherein, for performing the first test, the method further comprises:
identifying, from the registration file, a device communication command for the field device based on the retrieved at least one property;
executing the identified device communication command to the field device;
receiving, from the field device, a response to the executed device communication command; and
generating an output of the received response to be supplied to a user interface.

11. The method in claim 9, wherein, for performing the first test, the method further comprises:
identifying, from the registration file, a parameter index and a parameter index value for the field device based on the retrieved at least one property;
executing, to the field device, a write command to write the identified parameter index value to the identified parameter index of the field device;
detecting, from the field device, a response to the executed write command;
determining, based on the detected response, the result of the executed write command; and
generating, based on the determined result, an output of the received response to be supplied to a user interface.

12. The method in claim 9, wherein, for performing the second test, the method further comprises:
executing a predetermined device communication command to the field device, when the field device receives this device communication command, the field device generates one of a visual, audible or mechanical response;
receiving, from the field device, a response to the executed device communication command; and
generating an output of the received response to be supplied to a user interface.

13. The method in claim 9, wherein for performing the third test of determining the status of the field device, the method further comprises:
generating a first instruction to be supplied to a user interface to disconnect the field device from the field device commissioning system;
receiving a first response from the field device based on the first instruction;
generating a second instruction to be supplied to the user interface to connect the field device to the field device commissioning system based on the first response;
receiving a second response from the field device based on the second instruction;
determining a status of the field device based on the first response or the second response; and
generating an output of the determined status to be supplied to the user interface.

14. The method in claim 9, further comprising:
determining, from the field device information file, if the properties are to be updated, and
when the properties are determined to be updated,
retrieving the properties determined to be updated, and
updating the properties to the field device information file.

15. A non-transitory computer readable medium that stores a computer program to be executed by a field device commissioning system to perform a field device commissioning method, the field device commissioning system comprising a commissioning tool, the commissioning tool comprising hardware and software components and being configured to improve the operation of the field device commissioning system and to communicate with a field device in an industrial facility or plant and a repository, the field device commissioning method comprising:
retrieving at least one property from the field device;
comparing the retrieved at least one property with properties in a field device information file in the repository;

determining if the retrieved at least one property is identical to at least one of the properties in the field device information file in the repository;
  when the retrieved at least one property is determined to be identical to at least one of the properties in the field device information file in the repository, performing a first test which is a display test for the field devices;
  when the retrieved at least one property is determined to be not identical to at least one of the properties in the field device information file in the repository, determining, from a control system loop information file in the repository, if the retrieved at least one property is for a predetermined field device;
  when the retrieved at least one property is determined to be for the predetermined field device, performing a second test which is a communication test on the predetermined field device, different from the first test; and
when the retrieved at least one property is determined to be not for the predetermined device, performing a third test which is a field device state-determination test, different from the first and second tests, of determining a status of the field device.

* * * * *